United States Patent [19]

Arnold, III et al.

[11] Patent Number: 5,155,183

[45] Date of Patent: Oct. 13, 1992

[54] PROCESS FOR THE PREPARATION OF COPOLY(ARYLENE SULFIDE) HAVING AN ENHANCED RATE OF CRYSTALLIZATION

[75] Inventors: Ernest W. Arnold, III, Blountville; Joseph J. Watkins, Kingsport; David R. Fagerburg, Kingsport; Paul B. Lawrence, Kingsport, all of Tenn.

[73] Assignee: Eastman Kodak Company, Rochester, N.Y.

[21] Appl. No.: 685,776

[22] Filed: Apr. 16, 1991

[51] Int. Cl.$^5$ .................. C08G 75/10; C08G 75/14
[52] U.S. Cl. ........................... 525/537; 528/388; 528/389
[58] Field of Search ................. 525/537; 528/388

[56] References Cited

U.S. PATENT DOCUMENTS 4,977,224  12/1990  Watkins et al. ............... 525/539

Primary Examiner—Melvyn I. Marquis
Assistant Examiner—Helen F. Lee
Attorney, Agent, or Firm—Charles R. Martin; William P. Heath, Jr.

[57] ABSTRACT

Disclosed is a process for preparing a final copoly(arylene sulfide) by contacting an original copoly(phenylene sulfide) with a poly(phenylene sulfide) in the melt phase. The final copoly(arylene sulfide) exhibits an enhanced rate of crystallization.

6 Claims, No Drawings

PROCESS FOR THE PREPARATION OF COPOLY(ARYLENE SULFIDE) HAVING AN ENHANCED RATE OF CRYSTALLIZATION

The invention relates to a process for the preparation of a copoly(arylene sulfide) having an enhanced rate of crystallization by heating the copoly(arylene sulfide) in the presence of a poly(phenylene sulfide).

Poly(arylene sulfide) resins are thermosetting-thermoplastic polymeric materials with good thermal stability, unusual insolubility, resistance to chemical environments and inherent flame resistance. These resins additionally have good electrical insulative properties which make them ideal for electrical and electronic applications. Their excellent resistance to chemical degradation makes them ideal for use in chemical environments which involve organic solvents and strong mineral acids, such as coatings for pipes, tanks, pumps and other equipment.

Recently copoly(arylene sulfides) have been discovered. These polymers are disclosed in U.S. Pat. No. 4,786,713 and the method of their preparation is disclosed in U.S. Pat. No. 4,855,393. It has now been discovered that the rate of crystallization of those copoly(arylene sulfides) can be enhanced by heating the copoly(arylene sulfide) in the presence of a poly(phenylene sulfide).

Broadly the process of this invention can be described as a process for preparation of a final copoly(arylene sulfide) which corresponds to the structure

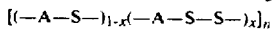

wherein A comprises 80 to 100 mole percent of a divalent phenylene radical and 20 to 0 mole percent of a divalent substituted or unsubstituted aromatic radical, x is in the range of 0.45 to 0, preferably 0.2 to 0 and n is at least 50, preferably at least 100. The final poly(arylene sulfide) is prepared by contacting an original copoly(arylene sulfide) corresponding to the structure

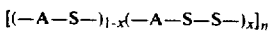

wherein A comprises 80 to 100 mole percent of a divalent phenylene radical and 20 to 0 mole percent of a divalent substituted or unsubstituted aromatic radical, x is in the range of 0.5 to 0.01 and n is at least 25, in the melt phase at a temperature in the range of 275°-375° C. with a poly(phenylene sulfide) which corresponds to the structure

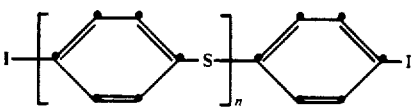

wherein n is in the range of 5 to 100.

The original copoly(arylene sulfide) which is contacted with poly(phenylene sulfide) is identical to the copoly(arylene sulfide) disclosed in U.S. Pat. No. 4,855,393 and U.S. Pat. No. 4,786,713, herein incorporated by reference, except in the original copoly(arylene sulfide) useful in this invention x is in the range of 0.5 to 0.01 and n is at least 25. The original copoly(arylene sulfide) is prepared in accordance with U.S. Pat. No. 4,855,393 except the reaction is controlled by stoichiometry, time, temperature and other conditions well known to those skilled in the art to result in a polymer with a shorter chain length and a different value of x.

The divalent substituted or unsubstituted aromatic radical A which comprises 0 to 20 mole percent of divalent radical A can be contributed from any of the diiodo aromatic compounds disclosed in the above cited patents. Preferably the divalent aromatic radical is provided by a compound selected from the group consisting of diiodobenzenes, diiodonaphthalenes, diiodobiphenyls, diiodophenyl sulfones, and diiodobenzophenones. More preferably the divalent aromatic radical is provided by a compound selected from the group consisting of p-diiodobenzene, m-diiodobenzene, p,p'-diiodobiphenyl, p,p'-diiododiphenyl ether, 2,6-diiodonaphthalene, (p-iodophenyl) sulfone, and 4,4'-diiodobenzophenone.

In this invention the amount of divalent aromatic radical that is not contributed by diiodobenzene is broadly in the range of 0 to 20 but is preferably in the range of 0 to 10. In the most preferred embodiment, all of the divalent aromatic radical is contributed by diiodobenzene.

In this invention, the range of the x value for the original copoly(arylene sulfide) is in the range of 0.5 to 0.01, preferably 0.20 to 0.1.

The range of the n value for the original copoly(phenylene sulfide) is at least 25, preferably at least 50.

The poly(phenylene sulfide) which is contacted with the original copoly(arylene sulfide) in accordance with the process of this invention corresponds to the structure

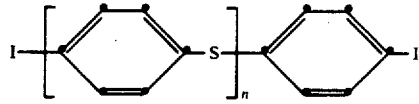

wherein n is in the range of 5 to 100, preferably 10 to 50.

These polymers and the method of their preparation are well known in the art and are described in U.S. Pat. No. 2,513,188 and U.S. Pat. No. 2,538,941. These polymers can also be prepared following the teachings of U.S. Pat. No. 4,786,713; U.S. Pat. No. 4,855,393; U.S. Pat. No. 4,877,862; U.S. Pat. No. 4,939,236; and U.S. Pat. No. 4,945,155 by use of reaction conditions or balancing the moles of sulfur and moles of diiodoaromatic compound such that the normally occurring disulfide linkages are absent.

The reaction between the original copoly(arylene sulfide) and the poly(phenylene sulfide) is carried out in the melt phase according to known techniques. In one embodiment the original copoly(arylene sulfide) is heated until it melts and then the molten copoly(phenylene sulfide) is contacted with molten poly(phenylene sulfide) until an admixture of polymers is formed. In a preferred embodiment, powders of both polymers are admixed and extruded.

During the reaction between the original copoly(arylene sulfide) and the poly(phenylene sulfide) elemental iodine is produced and evolves from the reaction melt. Removal of the elemental iodine provides a driving force for completion of the reaction. The iodine may be removed by passing a stream of air or an inert gas such as nitrogen or argon over or through the reaction mass at atmospheric or superatmospheric pressure or alternatively by applying a vacuum to the reaction apparatus. The elemental iodine may be collected and used as a commercial product or as a reactant for further chemical processes.

The ratio of the amount of poly(phenylene sulfide) to the amount of disulfide radicals in the final copoly(phenylene sulfide) is an important aspect of this invention. The ratio of poly(phenylene sulfide) to disulfide radical should not exceed two moles of poly(phenylene sulfide) to one mole of disulfide radical. When the ratio of poly(phenylene sulfide) to disulfide radical exceeds one, the molecular weight of the polymer is degraded and the polymer becomes terminated with iodoaryl end groups. Ideally, the ratio of poly(phenylene sulfide) to disulfide radicals should be exactly one. If the ratio cannot be controlled so that it is exactly one, it is preferred it be less than one so as to avoid molecular weight degradation and can be as low as 0.1 or more preferably as low as >0.25. This ratio is also influenced by reaction conditions with longer reaction times and temperatures requiring lower ratios. Thus, the ratio can broadly be in the range of 2.0 to 0.1, preferably in the range of 1.75 to 0.2 and most preferably in the range of 1.5 to 0.25.

The process of this invention can be carried out under a wide range of reaction conditions. Broadly, the reaction temperature should be no less than 275° C. and no higher than about 375° C. Preferably, the reaction temperature should not be less than 300° C. and no more than 350° C. The reaction temperature must in any event be high enough to obtain a melt of the polymer. Reaction times may vary considerably. Although in theory an almost infinitely long reaction time could be employed, in practice reactions are carried out for no longer than 8 hours and preferably no longer than 4 hours and more preferably no longer than 2 hours. The minimum reaction time will be dictated by the amount of time to achieve reaction of the diiodoaromatic compound and generally is at least 5 min. and preferably at least 10 min.

The utility of the polymer prepared by the process of this invention depends on the chain length, or value of n. When the value of n is sufficiently low that the polymer is a liquid, the polymer can be used as a coating or as a starting material for preparation of a high molecular weight polymer by solid stating or other conventional techniques for molecular weight buildup. When the value of n is sufficiently high the polymer is a solid, it can be used as a molding plastic or as a starting material for preparation of a polymer of even higher molecular weights by solid stating or other conventional means for increasing the molecular weight.

The final copoly(arylene sulfide) corresponds to the same structure as the original copoly(phenylene sulfide) however the value of n and x are different. In this invention the value of n for the final copoly(phenylene sulfide) is at least 50, preferably at least 100, and the value of x is in the range of 0.45 to 0, preferably 0.20 to 0.

If desired the molecular weight of the final copoly(arylene sulfide) can be increased by methods well known in the art. For example, the final copoly(arylene sulfide) may be solid state polymerized in accordance with the conditions disclosed in U.S. Pat. No. 4,877,862. The solid state polymerization can be carried out for as long as desired but for economic reasons is generally held to less than 30 hours. Optionally, the final copoly(arylene sulfide) can be melt condensed. The melt condensation time employed should be no less than 15 minutes and can be as much as desired but for economic reasons is generally less than 8 hours and more preferably less than 4 hours. The pressure employed for the melt condensation should be less than 50 torr and preferably less than 10 torr and more preferably less than 2 torr. The temperature of melt condensation must, of course, exceed the melting point of the polymer and is generally in the range of 300° to 400° C. with 300° to 375° C. being more preferred.

The enhanced rate of crystallization of the final copoly(arylene sulfide) prepared using the process of this invention is extremely significant. High rates of crystallization enables crystalline shaped articles, such as molded parts, extruded fibers or drawn film, to be more easily prepared because processing time is saved, thereby increasing production efficiency.

In this invention the crystallization rate of the final copoly(arylene sulfide) is measured by the difference in the DSC transitions of Tcc—Tch, hereafter referred to as the quantity "delta". If two polymers were blended together one would expect the delta value of the blend to be the linear weighted average of the two component polymers. This relationship can be expressed by the equation $$delta_{blend} = delta_1 \times weight\ fraction_1 + delta_2 \times weight\ fraction_2$$

Thus, for example, where equal weights of the original copoly(arylene sulfide) and poly(phenylene sulfide) are employed, the resultant $delta_{blend}$ would be expected to be the average of $delta_1$ and $delta_2$.

The transitions Tcc and Tch are defined by heating the polymer sample in a Differential Scanning Calorimeter (DSC) instrument at a scan rate of 20° C./min. the Tcc is determined by heating the polymer to a molten state, usually 300° C. and then cooling at 20° C./min. The peak of the exotherm observed is defined as the Tcc. The Tch is determined by heating a sample of polymer to the melt again and quenching the sample onto a metal block cooled in dry ice. The thus produced glassy sample is then heated from room temperature up to a melt. The peak of the exotherm observed in this heating sequence is defined as the Tch.

As will be recognized by those skilled in the art, there are numerous cases where either Tcc or Tch will be missing in the DSC trace because of the polymer system crystallization rate being so slow. This is normally a result of higher disulfide levels in the polymer. In such cases, delta becomes undefined and the means of comparison become the transition that does remain, such as Tch. Thus, comparing Tch's of the components and the final blend is also a valid means of assessing the expected transition vs. the one actually observed for the blend. The equation used for comparison is the same as above except substituting Tcc for delta.

In the examples given below, differential scanning calorimetry (DSC) is performed using a Du Pont 951 Thermoanalyzer instrument and employing a scanning rate of 20° C./min.

EXAMPLE 1

This example illustrates the preparation of a copoly(phenylene sulfide) which can be used as the original copoly(phenylene sulfide) in the process of this invention.

A copoly(phenylene sulfide) is prepared in a 4 L resin kettle equipped with a heating mantel, a stir shaft and blade, an air inlet, a melt thermocouple, and a column attached to a distillation head and a receiver for removal and collection of the iodine produced. The following were added to the kettle: 3678.4 g (11.15 mol) p diiodobenzene, 310.4 g (9.681 mol) sulfur, and 6.3 g of 2,4-diiodo nitrobenzene as the catalyst. The reactor was held at 200 torr pressure and the mixture heated to a melt temperature of 227° C. and held there for 2.5 hr. After that time the melt temperature was raised to 238° C. and held there for 1.5 hr. The pressure was then reduced to 120 torr, then to 60 torr, and then to 30 torr. Holding time at each pressure was 30 min. After this time, the melt temperature was raised to 250° C. and the pressure reduced to 2 torr. The material was held under these conditions for 1.5 hr and then cooled in air. The solid mass was granulated and solid state polymerized at 240° C. for 24 hr. under a 1.0 ft³/hr nitrogen sweep. The solid stated polymer had a $T_{cc}$ of 178° C. and a $T_{ch}$ of 205° C. for a delta of −27°.

This polymer produced tough films but its slow crystallization rate limits its ability to be used for injection molding applications or others that require a fast crystallizing polymer.

EXAMPLE 2

This example illustrates the preparation of a poly(phenylene sulfide) which can be used in the process of this invention.

A poly(phenylene sulfide) is prepared in a 4 L resin kettle as in Example 1 except that the p-diiodobenzene amount employed was 4109.9 g (12.458 mol). The polymer was granulated and solid state polymerized as in Example 1 to give a polymer with $T_{cc}$ of 224° C. and a $T_{ch}$ of 125° or a delta of 99°.

This polymer would not form coherent films owing to its very brittle nature which means that in spite of its excellent crystallization characteristics, it is too low in molecular weight to be useful.

EXAMPLE 3

This example illustrates the process of this invention.

Powers of the polymers from Example 1 and Example 2 are mixed, 50 g each, and then extruded at 300° C. in a extruder, quenched in a water trough and pelletized. The polymer after extrusion was solid state polymerized as in Example 1 and was found to have a $T_{cc}$ of 211° C. and a $T_{ch}$ of 146° C. for a delta of 65°.

The expected delta from the two constituent polymers using the equation described in the specification is 36°. The observed delta of 65° illustrates that the material produced by the process of this invention has superior crystallization characteristics over those expected. A pressed film of the final copoly(arylene sulfide) was tough and useful in a molding application.

EXAMPLE 4

This example further illustrates preparation of a poly(phenylene sulfide) and the practice of the process of this invention.

A low molecular weight poly(phenylene sulfide) was prepared according to the following: Into a 500 ml 3-neck round bottom flask are weighed the following: 31.0 g sulfur (0.967 mol), 410 g p diiodobenzene (1.24 mol), and 0.8 g of 2,4 diiodo I nitrobenzene to act as a catalyst. The flask was fitted with a 350 mm Vigreux column, a mechanical stirrer through the center joint, and an inlet tube for a slow air sweep. The column was attached via a distillation head and a takeoff tube to a distillation receiver which was cooled in dry ice. The receiver was connected to a vacuum source. The flask was maintained at 300 torr pressure and immersed in a metal bath controlled at 230° C. It was held under these conditions for 2.5 hr. at which time the bath temperature was raised to 240° C. After 1.5 hr, the pressure was reduced to 120 torr, held for 0.5 hr, reduced to 60 torr where it was held for an additional 0.5 hr followed by pressure reduction to 30 torr for 0.5 hr and finally by pressure reduction to 0.5 torr where it was held for 1.5 hr. Simultaneous with the last pressure drop the bath temperature was raised to 250° C. The melt solidified after less than 1 hr under 0.5 torr pressure. The reaction flask was removed from the metal bath, repressurized with nitrogen, and allowed to cool under nitrogen. The ground polymer was solid state polymerized at 240° C. under a nitrogen flow of 1.0 ft³/hr. Elemental analysis was used to estimate the degree of polymerization of the oligomer as 39. The material showed a $T_{ch}$ of 228° C. for a Delta value of 103°. This poly(phenylene sulfide), 29.59 g, was blended with the original copoly(arylene sulfide) of Example 1, 10.41 g, which was calculated to give a 2:1 ratio of iodo-end groups to disulfides in the oligomer to the high disulfide polymer respectively. The crystallization characteristics of the blend after melt condensation for 1 hr at 300° C. under 1.8 torr pressure were measured by DSC as follows: a $T_{ch}$ of 134° C., a $T_{cc}$ pf 235° C. The measured Delta was 101° while the Delta expected from this equation in the specification was 69°. Thus, the measured Delta is 32° above that expected.

EXAMPLE 5

This example further illustrates preparation of a poly(phenylene sulfide) and the practice of the process of this invention.

The poly(phenylene sulfide) preparation of Example 4 was repeated but using different levels of sulfur in the two preparations:

|   | g Sulfur | mol Sulfur | $T_{ch}$·°C. | $T_{cc}$ | DP |
|---|---|---|---|---|---|
| A | 29.0 | 0.904 | none | 242 | 19 |
| B | 26.0 | 0.811 | none | 224 | 10 |

As shown, neither of these oligomer preparations showed a $T_{ch}$ value so that only the $T_{cc}$ value can be used for comparison purposes in the final blend. These two oligomers were each blended with the original copoly(arylene sulfide) of Example 1 according to the following table and melt condensed for 1 hr at 300° C. under 1.8 torr pressure giving the DSC results shown:

|   | Oligomer, g | Ex. 1, g | $T_{ch}$·°C. | $T_{cc}$·°C. | exp. $T_{cc}$·°C. |
|---|---|---|---|---|---|
| A | 24.28 | 15.72 | 125 | 239 | 203 |
| B | 18.78 | 21.22 | 116 | 237 | 202 |

It is apparent that the $T_{cc}$ value of each of the blends produced by the process of this invention is much higher than would have been expected, thus illustrating the higher crystallization rate of the final copoly(phenylene sulfide) resulting from the practice of this invention.

EXAMPLE 6

This example further illustrates the practice of this invention.

The poly(phenylene sulfide) of Example 4 was blended with the original copoly(arylene sulfide) of Example 1 according to the following table and melt condensed for 1 hr at 300° C. under 1.8 torr pressure to give blends with the DSC properties shown:

| g | Ex. 1. g | Ratio | $T_{ch}$.°C | $T_{cc}$.°C | Delta(exp.) |
|---|---|---|---|---|---|
| 12.27 | 27.73 | 1.0 | 132 | 221 | 89° (13°) |
| 7.25 | 32.75 | 0.5 | 157 | 192 | 35° (−3°) |

The ratio is the ratio of the iodo end groups to disulfide linkages. The expected Delta values of the blends are computed from the equation disclosed in the specification and are shown in parentheses. The Delta values obtain are much higher than those expected.

We claim:

1. A process for preparation of a final copoly(arylene sulfide) which corresponds to the structure

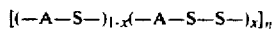

wherein A comprises 80 to 100 mole percent of a divalent phenylene radical and 20 to 0 mole percent of a divalent substituted or unsubstituted aromatic radical, x is in the range of 0.45 to 0 and n is at least 50, comprising contacting an original copoly(arylene sulfide) corresponding to the structure

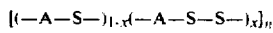

wherein A comprises 80 to 100 mole percent of a divalent phenylene radical and 20 to 0 mole percent of a divalent substituted or unsubstituted aromatic radical, x is in the range of 0.5 to 0.01 and n is at least 25, in the melt phase at a temperature in the range of 275°-375° C. with a poly(phenylene sulfide) which corresponds to the structure

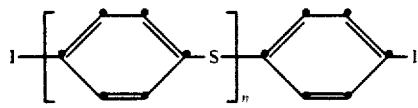

wherein n is in the range of 5 to 100.

2. The process of claim 1 wherein the divalent aromatic radical comprising 0 to 20 mole percent of the copoly(arylene sulfide) is provided by a compound selected from the group consisting of diiodobenzenes, diiodonaphthalenes, diiodobiphenyls, diiodotoluenes, diiodophenyl sulfones, and diiodobenzophenones.

3. The process of claim 2 wherein the divalent aromatic radical comprising 0 to 20 mole percent of the copoly(arylene sulfide) is provided by a compound selected from the group consisting of p-diiodobenzene, p,p'-diiodobiphenyl, p,p'-diiododiphenyl ether, 2,6-diiodonaphthalene, (p-iodophenyl) sulfone, and 4,4'-diiodobenzophenone.

4. The process of claim 1 wherein A comprises 90 to 100 mole percent of a divalent phenylene radical and 10 to 0 mole percent of a divalent substituted or unsubstituted aromatic radical.

5. A process for preparation of a final copoly(phenylene sulfide) which corresponds to the structure

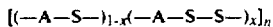

wherein A is a divalent phenylene radical, x is in the range of 0.20 to 0 and n is at least 50, comprising contacting an original copoly(phenylene sulfide) corresponding to the structure

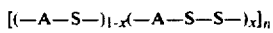

wherein A is a divalent phenylene radical, x is in the range of 0.20 to 0 and n is at least 25, in the melt phase at a temperature in the range of 300°-350° C. with a poly(phenylene sulfide) which corresponds to the structure

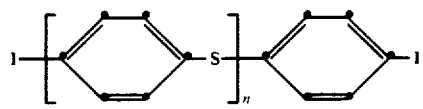

wherein n is in the range of 10 to 50.

6. A process for preparation of a final copoly(phenylene sulfide) which corresponds to the structure

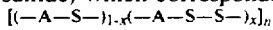

wherein A is a divalent phenylene radical, x is in the range of 0.20 to 0 and n is at least 100, comprising contacting an original copoly(phenylene sulfide) corresponding to the structure

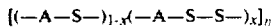

wherein A is a divalent phenylene radical, x is in the range of 0.20 to 0.1 and n is at least 50, in the melt phase at a temperature in the range of 300°-350° C. with a poly(phenylene sulfide) which corresponds to the structure

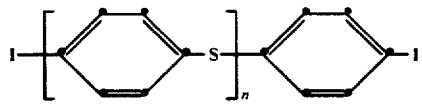

wherein n is in the range of 10 to 50.

* * * * *